United States Patent
Oh et al.

(10) Patent No.: US 7,822,902 B2
(45) Date of Patent: Oct. 26, 2010

(54) WIRELESS UNIVERSAL SERIAL BUS SYSTEM USING A HOST-ADDING BIT AND DRIVING METHOD THEREOF

(75) Inventors: Seung-Hwan Oh, Suwon-si (KR); Yon-Suk Kim, Daejeon (KR); Chang-Woo Seo, Suwon-si (KR); Ju-Hyun Jung, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 27 days.

(21) Appl. No.: 12/238,956

(22) Filed: Sep. 26, 2008

(65) Prior Publication Data
US 2009/0089476 A1 Apr. 2, 2009

(30) Foreign Application Priority Data
Sep. 28, 2007 (KR) ...................... 10-2007-0098042

(51) Int. Cl.
G06F 13/14 (2006.01)
(52) U.S. Cl. ........................ 710/305; 710/105; 710/300
(58) Field of Classification Search ......... 710/300–315, 710/36–38, 31–33, 20–22, 104–107
See application file for complete search history.

(56) References Cited

U.S. PATENT DOCUMENTS

| | | | |
|---|---|---|---|
| 6,546,450 B1 | 4/2003 | Liu | |
| 7,478,188 B2 * | 1/2009 | Patton | 710/300 |
| 7,596,646 B2 * | 9/2009 | Kim et al. | 710/72 |
| 2005/0091437 A1 * | 4/2005 | Yang et al. | 710/313 |
| 2007/0245057 A1 | 10/2007 | Bohm et al. | |
| 2007/0260801 A1 * | 11/2007 | Kwak et al. | 710/305 |
| 2007/0283075 A1 | 12/2007 | Patton | |
| 2007/0294456 A1 * | 12/2007 | Chan et al. | 710/313 |
| 2007/0300004 A1 * | 12/2007 | Yun | 710/313 |
| 2008/0215774 A1 * | 9/2008 | Kim et al. | 710/62 |
| 2009/0092123 A1 * | 4/2009 | Aoki | 370/350 |
| 2009/0204737 A1 * | 8/2009 | Seo et al. | 710/105 |

FOREIGN PATENT DOCUMENTS

| | | |
|---|---|---|
| EP | 1 655 912 | 5/2006 |
| EP | 1 870 819 | 12/2007 |
| KR | 1020060039699 | 5/2006 |
| KR | 1020070016622 | 2/2007 |
| KR | 1020070036388 | 4/2007 |
| WO | WO 2007147353 | 12/2007 |

\* cited by examiner

*Primary Examiner*—Raymond N Phan
(74) *Attorney, Agent, or Firm*—F. Chau & Associates, LLC

(57) ABSTRACT

A wireless universal serial bus system (WUSB) includes a device, a first host, and a second host. The first host communicates with the device through a first superframe according to a wireless USB protocol. The first host sets a host-adding bit in the first superframe when the second host transfers a second superframe to the first host according to the wireless USB protocol to enable communication between the second host and the device.

18 Claims, 5 Drawing Sheets

Fig. 3

MAC Header

| 2 byte | 2 byte | 2 byte | 2 byte | 2 byte |
|---|---|---|---|---|
| Frame Control | DestAddr | SrcAddr | Sequence Control | Access Information |

| Bits | Name | Value |
|---|---|---|
| 2:0 | Version | 00B |
| 3 | Secure | 0B |
| 5:4 | ACK policy | 00B |
| 8:6 | Frame type | 001B |
| 12:9 | Frame Subtype | 1110B |
| 13 | Retry | 0B |
| 14 | Adding HOST | 1B |
| 15 | Reserved | 0B |

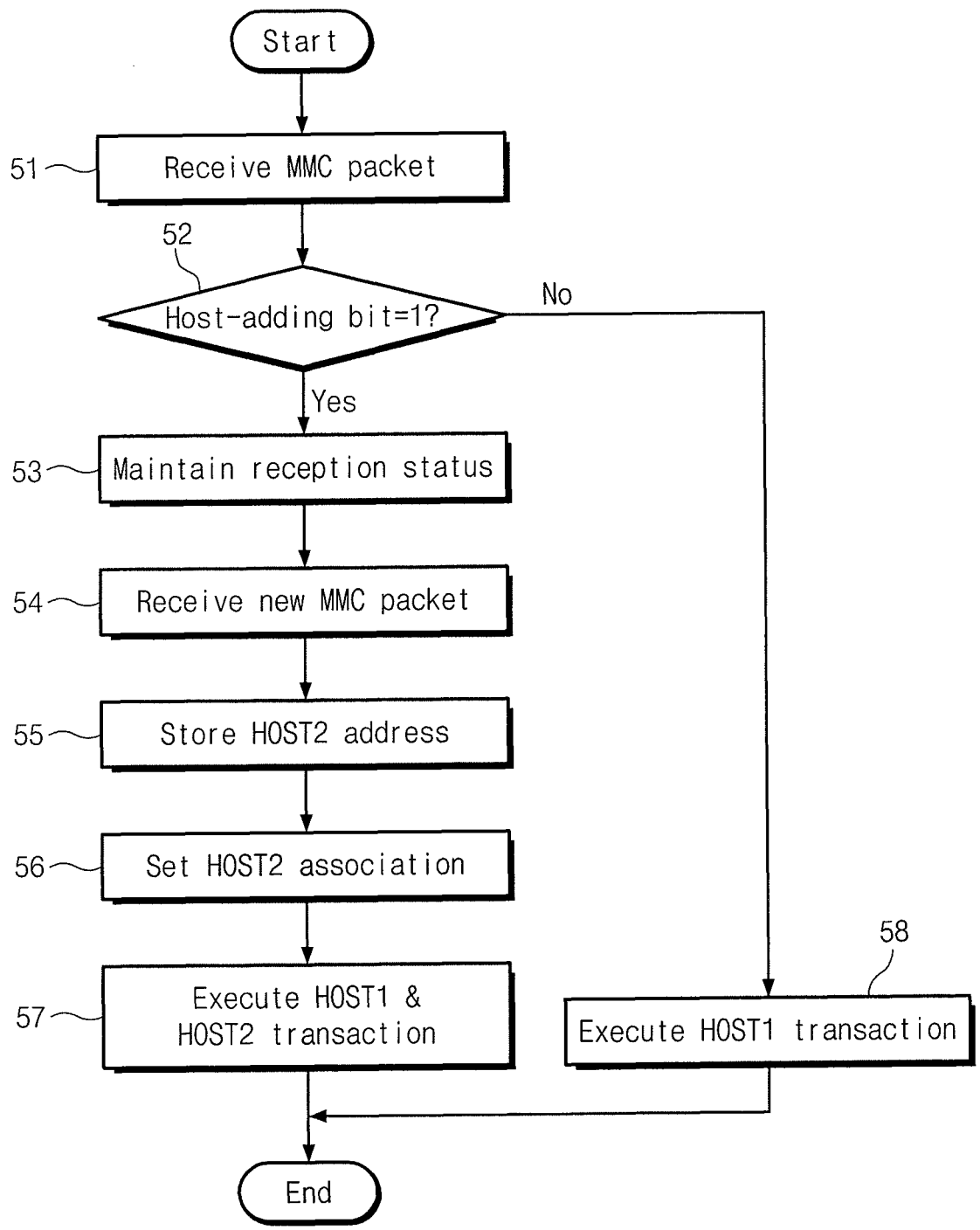

WIRELESS UNIVERSAL SERIAL BUS SYSTEM USING A HOST-ADDING BIT AND DRIVING METHOD THEREOF

CROSS-REFERENCE TO RELATED APPLICATIONS

This patent application claims priority under 35 U.S.C. §119 to Korean Patent Application No. 10-2007-0098042, filed on Sep. 28, 2007, the disclosure of which is incorporated by reference herein.

BACKGROUND

1. Technical Field

The present disclosure relates to wireless universal serial bus (WUSB) systems.

More particularly, the present disclosure relates to a system and method of accessing a device by a plurality of hosts using a WUSB protocol.

2. Discussion of Related Art

Wireless interfaces are used to enable communications between networking devices in a wireless network environment using various wireless communication protocols such as Infrared Data Association (IrDA), Bluetooth, and WUSB. IrDA enables communication between devices using infrared. Bluetooth enables connections between devices using a Frequency-Hopping Spread-Spectrum (FHSS) modulation scheme. WUSB is a short-range, high-bandwidth wireless radio communication protocol. WUSB is a wireless extension to USB that combines the speed and security of wired technology with the ease-of-use of wireless technology.

USB is a serial bus standard to interface devices to a host computer. USB was developed to allow many peripheral devices (e.g., mice, printers, modems, speakers, etc.) to be connected using a single standardized interface socket. USB ports installed in personal computers (PCs) facilitate transfer of data between PCs and devices such as mobile phones or digital cameras.

USB can support data transmission rates in excess of 12 Mbps, while traditional serial ports can only support transmission rates upwards of 100 kbps. Further, USB allows network devices to interface with one another without requiring the installation of complicated adaptors. Further, USBs enable 127 devices to be connected with each other in a chain. Since USBs provide uniformity of ports in connecting different types of peripheral devices, they can reduce the number of connection ports.

While use of USBs are widespread in wired devices, WUSB systems have been used in wireless networks. In a conventional WUSB system, a PC functioning as an arbiter operates as a WUSB host and can be connected to peripheral devices supporting the WUSB system. For another PC to act as a WUSB host, the another PC needs to become an arbiter of an independent arbiter-based wireless network.

The number of the WUSB hosts is restricted in practice in an arbiter-based wireless network. Thus, there is a need for systems and methods of accessing a device by a plurality of hosts using a WUSB protocol.

SUMMARY OF THE INVENTION

A WUSB system according to an exemplary embodiment of the present invention includes a plurality of hosts and a device. The device communicates with each of the plurality of hosts according to a wireless universal serial bus protocol. A first host provides host-adding information to the device when there is a request by a second host for communication with the device while the first host is communicating with the device.

A WUSB system according to an exemplary embodiment of the present invention includes: a first host, a second host, and a device. The first host communicates with the device through a first superframe according to a WUSB protocol. The first host sets a host-adding bit in the first superframe when the second host transfers a second superframe to the first host according to the WUSB protocol to enable communication between the second host and the device.

The first host may reset or clear the host-adding bit when the device identifies addition of the second host. Each of the first and second superframes may include a beacon and a distributed reservation protocol region for communication with the device. The distributed reservation protocol region may include a micro-scheduled management command packet and a data field. The micro-scheduled management command packet of the first superframe may include a media access control header having the host-adding bit. The wireless universal serial bus protocol may support a WiMedia protocol. The device may be one of a wireless printer, a wireless scanner, a wireless mouse, or a wireless keyboard.

A method of driving a wireless universal serial bus system according to an exemplary embodiment of the present invention includes: communicating between a first host and a device through a first superframe according to a wireless universal serial bus protocol, and setting a host-adding bit of the first superframe when a second host generates a second superframe according to the wireless universal serial bus protocol to enable communication between the second host and the device. The first host may reset or clear the host-adding bit when the device identifies addition of the second host.

BRIEF DESCRIPTION OF THE DRAWINGS

The present invention will become readily apparent with reference to the following detailed description when considered in conjunction with the accompanying drawings. Like reference numerals refer to like parts throughout the various drawings unless otherwise specified. In the figures:

FIG. 3 illustrates an embodiment of the MAC header of the MMC packet shown in FIG. 2;

FIG. 5 is a flow chart showing a procedure for identifying and operating the second host by a device according to another exemplary embodiment of the present invention.

DETAILED DESCRIPTION OF EXEMPLARY EMBODIMENTS

Exemplary embodiments of the present invention will be described below in more detail with reference to the accompanying drawings. The present invention may, however, be embodied in different forms and should not be construed as limited to the embodiments set forth herein.

Throughout the specification, WUSB system refers to a wireless form of USB. A WUSB system may operate at a data transmission rate upwards of 480 Mbps within a 2 m range or at a data transmission rate upwards of 110 Mbps within a range of 10 m. The USB system may operate by means of ultra-wide band (UWB).

Throughout the specification, a WUSB media access control or controller (WUSB-MAC) refers to a centralized MAC scheduled in time by means of a packet. The packet is referred to as micro-scheduled management command (MMC) according to the WiMedia MAC protocol. Further, throughout the specification, a centralized MAC refers to a system that is composed of one host and multiple devices.

A WUSB system according to an exemplary embodiment of the present invention includes: a device, and a plurality of hosts. A first host communicates with the device through a first superframe according to a WUSB protocol. A second host attempts to communicate with the device by generating a second superframe according to the same WUSB protocol. The first host sets a host-adding bit in the first superframe in response to reception of the second superframe. The first host resets the host-adding bit when the device identifies addition of the second host. The system enables a single device to connect to a plurality of hosts using a WUSB protocol.

Figure 1A:
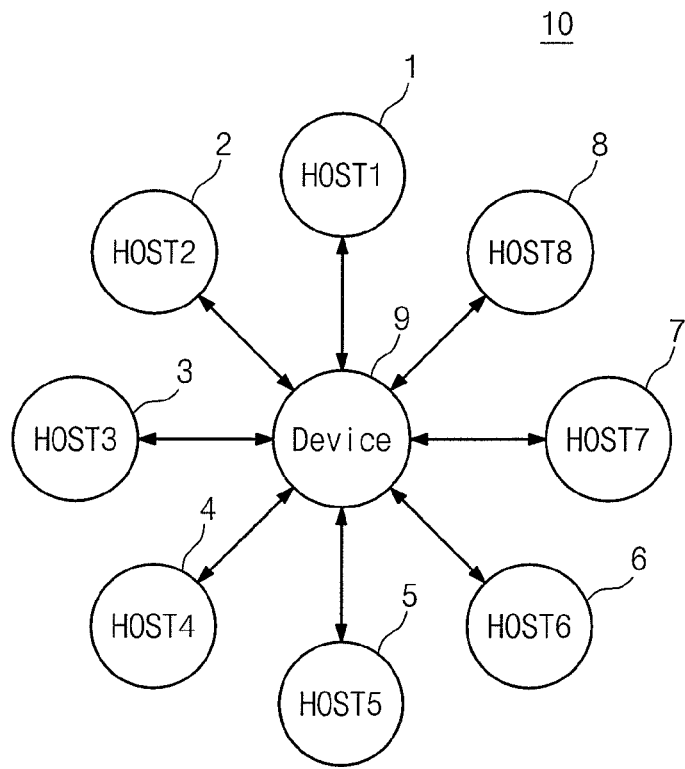
FIGS. 1A and 1B illustrate a WUSB system according to an exemplary embodiment of the present invention.
Figure 1B:
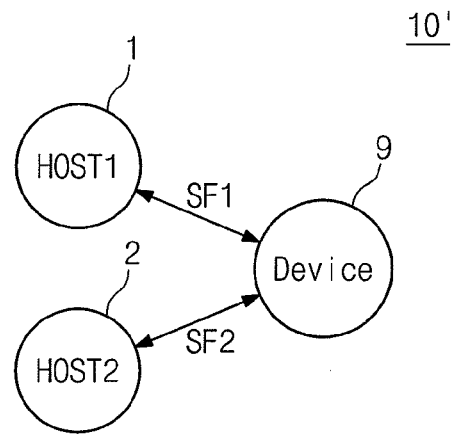

FIGS. 1A and 1B illustrate a WUSB system according to exemplary embodiment of the present invention. Referring to FIGS. 1A and 1B, the WUSB system 10 (or 10') includes a plurality of hosts 1~8 and a single device 9. FIG. 1B focuses on a portion of the WUSB system of FIG. 1A, namely host 1, host 2, and device 9. When the first host 1 accesses the device 9, the first host 1 transfers a first superframe SF1 to the device 9. For example, the device 9 may be a wireless printer, a wireless scanner, a wireless mouse, a wireless keyboard, etc.

The first superframe SF1 includes information needed for data communication between the first host 1 and the device 9. For example, the superframe SF1 may include beacon information, distributed reservation protocol (DRP) regions, a source address, a destination address, communication time, a version of WiMedia, and data.

Figure 2:
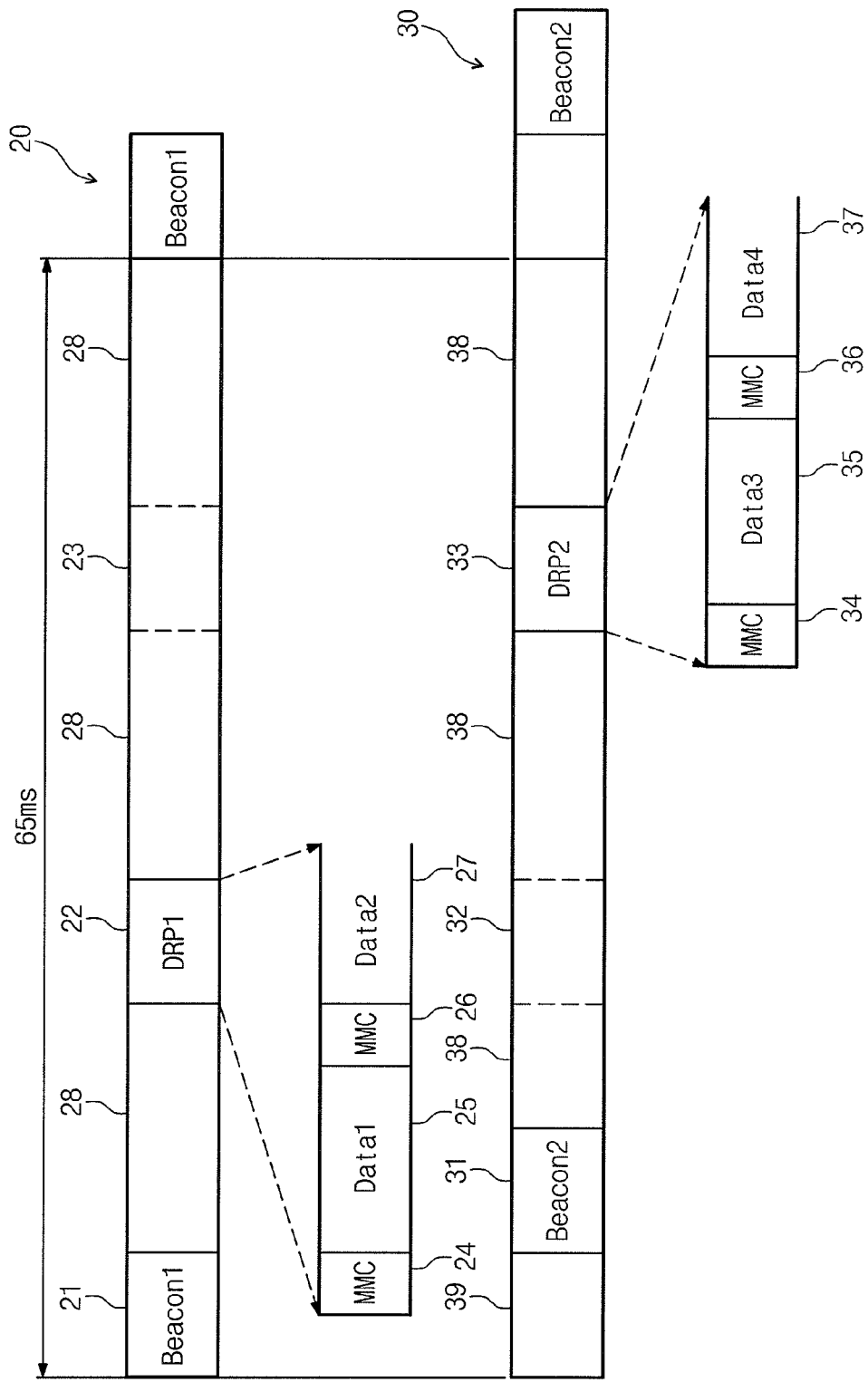
FIG. 2 illustrates an embodiment of the superframe generated from the first and second hosts shown in FIGS. 1A and 1B.

When the second host 2 desires access to the device 9, the second host 2 transfers a second superframe SF2 to the first host 1 and the device 9. Examples of the first and second superframes SF1 and SF2 are illustrated in FIG. 2. The first host 1 receives the second superframe SF2, searches for a new beacon in the second superframe SF2, and confirms whether the second host 2 has been added to the device 9. A beacon acts as a time synchronization reference for transmission operations of devices in a WiMedia MAC environment.

The WiMedia MAC may be a distributed MAC. The distributed MAC may include transmission of superframes operating in a cycle period of 65 ms based on a UWB. In the distributed MAC, each node may function as a host.

The first host 1 sets a host-adding bit in an MMC packet stored in a distributed reservation protocol (DRP) region of the first superframe SF1. The host 1 provides the device 9 with the first superframe SF1 to which the host-adding bit is set. The device 9 receives the first superframe SF1 and transfers a reply signal. If the device 9 identifies addition of the second host 2, the first host 1 resets the host-adding bit. DRP is a protocol for allocating a period of time to a specific device or a plurality of hosts in the WiMedia MAC. The MMC is a packet transferred by a host that functions as a post. Accordingly, the second host 2 is added to the WUSB system between the first host 1 and the device 9.

If the third device desires to access the device 9, the third host 3 transfers a third superframe to the first and second hosts 1 and 2, and the device 9. The first host 1 receives the third superframe and confirms addition of the third host 3 by locating a new beacon in the third superframe.

The first host 1 sets a host-adding bit in the MMC packet stored in the DRP region DRP1 of the first superframe SF1. If the device 9 identifies addition of the third host 3, the first host 1 resets the host-adding bit. The second host 2 can set a host-adding bit in an MMC packet stored in a DRP region DRP 2 of the second superframe SF2 instead of the first host 1.

The first host 1 can add the second through eighth hosts 2~8 to the WUSB system using the above described procedure. Thus, an WUSB system according to at least one embodiment of the present invention enables communication between a single device and a plurality of hosts.

A method of communicating between a plurality of hosts and a single device according to an exemplary embodiment of the present invention will be described with reference to FIG. 2. The method transmits superframes according to a WUSB protocol. FIG. 2 shows an embodiment of the first superframe that may be transmitted by the first host 1 and an embodiment of the second superframe that may be transmitted by the second host, according to the WUSB protocol.

Referring to FIGS. 1A and 2, one cycle period of the first and second frames 20 and 30 may be 65 ms or approximately 65 ms. The first superframe 20 includes a first beacon 21, a first DRP region 22, and a second DRP region 23. The first beacon 21 denotes a start of the first superframe 20, having time allocation information about the first and second DRP regions 22 and 23. The first DRP region 22 is a field assigned by time for data communication between the first host 1 and the device 9. The second DRP region 23 is a field assigned by time for data communication between the second host 2 and the device 9. Namely, the second DRP region 23 of the first superframe 20 is a time allocation region reserved for use by the second host 2. The first superframe 20 includes time allocation regions 28 for separating or delineating the first beacon 21, the first DRP region 22, and the second DRP region 23.

The second superframe 30 includes a second beacon 31, a first DRP region 32, and a second DRP region 33. The second beacon 31 denotes a start of the second superframe 30, having time allocation information about the first and second DRP regions 32 and 33. The second DRP region 33 is a field assigned by time for data communication between the second host 2 and the device 9. The first DRP region 32 is a field assigned by time for data communication between the first host 1 and the device 9. Namely, the first DRP region 32 of the second superframe 30 is a time allocation region reserved for use by the first host 1. Thus, the first and second beacons 21 and 31 are associated with the time allocation information about the first and second DRP regions 22 and 23, preventing overlap in time between the first and second DRP regions 22 and 23. Thus, the second superframe 30 includes time allocation regions 38 for separating or delineating the second beacon 31, the first DRP region 32, and the second DRP region 23. The device 9 releases a reception status so as to reduce power consumption when there is no transmission of data by the first and second hosts 1 and 2.

One DRP region is separated or delineated into pluralities of MMC packets and data fields. Each MMC packet includes an MMC header. The MMC header includes an MAC receiver address, an MAC transmitter address, and an Ethernet-type information.

The first host 1 has a new host-adding bit contained in the MMC packet belonging to the DRP region 22. If a new host appears, the first host 1 sets the host-adding bit.

FIG. 3 shows an embodiment of the MAC header of a MMC packet shown in FIG. 2. Referring to FIG. 3, the MAC header may be included in the DRP regions of the first and second superframes 20 and 30 shown in FIG. 2.

The MAC header may include 10 bytes. For example, the MAC header may include a 2-byte frame control information (FrameControl), a 2-byte destination address (DestAddr), a 2-byte source address (SrcAddr), a 2-byte sequence control information (SequenceControl), and a 2-byte access information.

The frame control information is a detailed option about the current packet. The destination address is an MAC receiver address and the source address is an MAC transmitter address. The sequence control information denotes a packet sequence (e.g., packet number) and a fragment sequence. The access information denotes a practical communication time in the air.

The frame control information includes three version bits (Version), a secure bit (Secure), two acknowledgement policy bits (ACK policy), three frame-type bits (Frame Type), four frame-subtype bits (Frame Subtype), a retry bit (Retry), a host-adding bit (Adding Host), and a reserve bit (Reserve).

The version bits denote the WiMedia version. The secure bit denotes the status of security for the MMC packet. The ACK policy bits inform how to accept an acknowledgement packet of the MMC packet.

The frame-type bits denote a current type of the MMC packet. Frames are differentiated based on the type of beacon, control, command, and data. The frame-subtype bits denote user priority or a stream index. The retry bit represents the status of retrying the MMC packet. The host-adding bit is set when a new host is added thereto and cleared when the device identifies the new host. The reserve bit is not used at present.

The WUSB system according to the present embodiment operates by setting a host-adding bit of an MMC header when a new host is added thereto and resetting the host-adding bit when the device identifies the new host.

Figure 4:
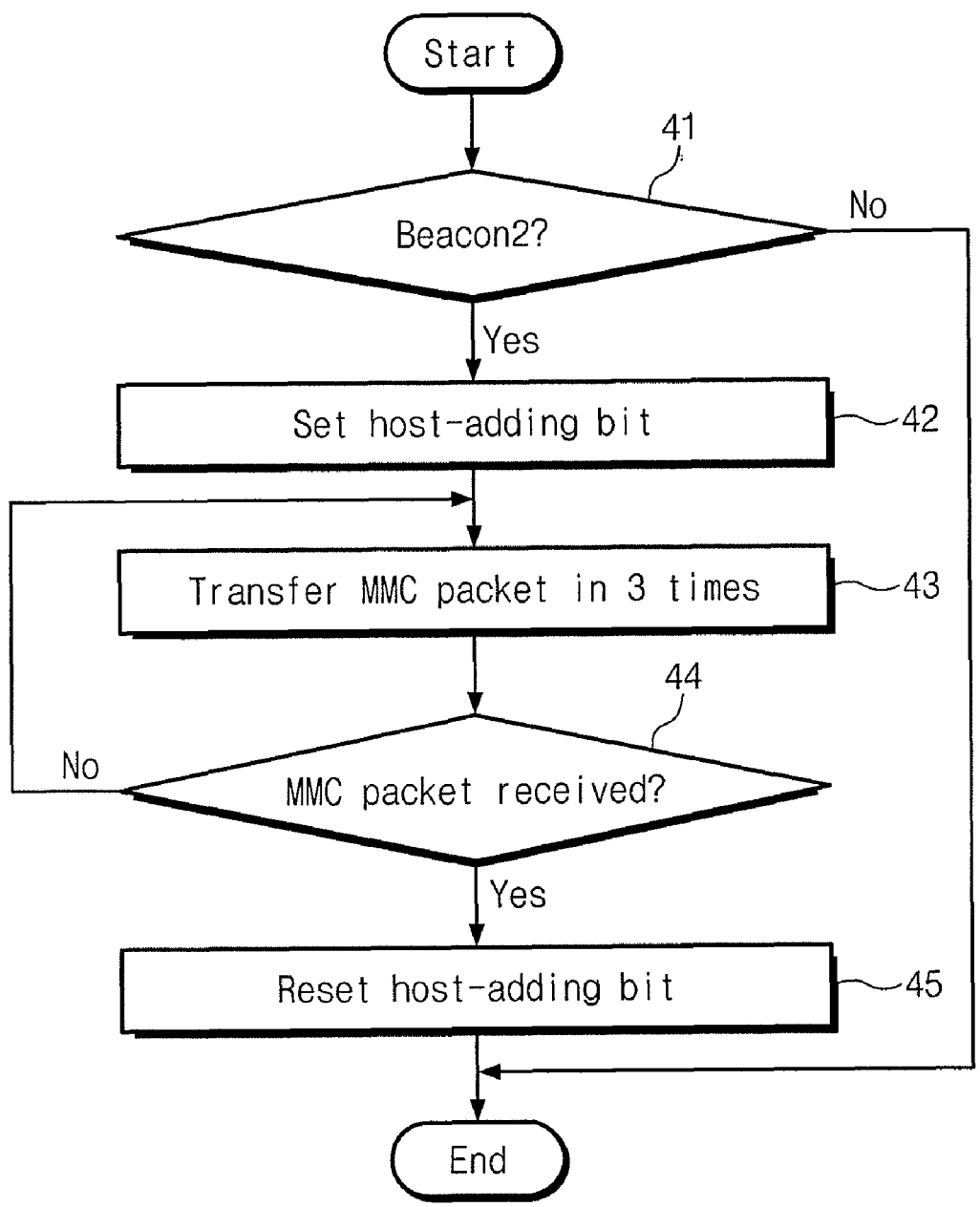
FIG. 4 is a flow chart showing a procedure for detecting the second host by the first host according to an exemplary embodiment of the present invention.

FIG. 4 is a flow chart showing a procedure for detecting the second host 2 by the first host 1 according to an exemplary embodiment of the present invention. Referring to FIGS. 1A through 4, if the second host 2 needs to access the device 9 while the first host 1 is accessing the device 9, the second host 2 generates the second superframe 30. The first host 1 searches for the second beacon (Beacon2) 31 in the second superframe 30 (step 41).

If the second beacon 31 is present in the second superframe 30, the first host 1 sets the host-adding bit of the MMC header (step 42). However, if the second beacon 31 is not present in the second superframe 30, the host 1 stops the operation for adding the second host 2.

The first host 1 transmits the MMC packet, which includes the host-adding bit, to the device 9. Since the device 9 may not receive the MMC packet in a first transmission, the first host 1 may be configured to transmit the MMC packet to the device 9 several times. For example, FIG. 4 illustrates one embodiment where the first host 1 transmits the MMC packet, which includes the host-adding bit, to the device three times (step 43). The device 9 determines whether the MMC packet has been received (step 44).

If the device 9 determines that the MMC packet has been received, the first host 1 resets (or clears) the host-adding bit of the MAC header (step 45). However, if the device 9 has still not received the MMC packet, the host 1 may resend the device 9 the MMC packet that includes the reset host-adding bit one or more times. For example, in the embodiment shown in FIG. 4, the host 1 may resend the MMC packet three times (step 43).

FIG. 5 is a flow chart showing a procedure for identifying and operating the second host (HOST2) 2 by the device 9 according to an exemplary embodiment of the present invention. Referring to FIGS. 1A and 5, the device 9 receives the MMC packet from the first host (HOST1) 1 (step 51). The device 9 determines whether the host-adding bit of the MMC packet received from the first host 1 is '1' (step 52).

If the host-adding bit of the MMC packet received from the first host 1 is '1', the device 9 maintains its reception status for one cycle period (e.g., 65 ms) in order to scan the second host 2 (step 53). For example, the device 9 releases the reception status during the period 28 in which there is no transmission of signal from the host 1 to reduce power consumption. However, the device 9 need not release the reception status for one cycle period in order to accept the second superframe 30 from the second host 2. Unless the host-adding bit of the MMC packet received from the first host 1 is '1', the device 9 maintains its communication status with the first host 1 (step 58).

The device 9 receives a new MMC packet of the second superframe 30 transferred from the second host 2 (step 54). The device 9 stores a MAC address of the second host 2 from the new MMC packet (step 55). The device 9 sets association of the second host 2 (step 56). For example, the host 2 may encrypt data to be transferred to the device 9 and transfer a key value to the device 9. Then, the device 9 communicates with the first and second hosts 1 and 2 (step 57). Accordingly, the WUSB system can accomplish data communication between the device 9 and the first and second hosts 1 and 2.

As described above, at least one embodiment of the present invention provides a WUSB system in which a single device is connected to a plurality of hosts, and a method for driving said WUSB system.

While exemplary embodiments of the present invention have been described, it is understood that the present invention is not limited to these exemplary embodiments, but various changes and modifications can be made by one ordinary skilled in the art within the spirit and scope of the disclosure.

What is claimed is:

1. A wireless universal serial bus system comprising:
 a plurality of hosts; and
 a device communicating with each of the plurality of hosts in accordance with a wireless universal serial bus protocol,
 wherein a first host sets a host-adding bit and provides the host-adding bit to the device when there is a request by a second host for communication with the device while the first host is communicating with the device.

2. The wireless universal serial bus system as set forth in claim 1, wherein the first host communicates with the device through a first superframe in accordance with the wireless universal serial bus protocol.

3. The wireless universal serial bus system as set forth in claim 2, wherein the first superframe includes the host-adding bit.

4. The wireless universal serial bus system as set forth in claim 1, wherein the device receives the host-adding bit from the first host and communicates with the second host in accordance with the wireless universal serial bus protocol.

5. A wireless universal serial bus system comprising:
 a device;
 a first host communicating with the device through a first superframe in accordance with a wireless universal serial bus protocol; and
 a second host,
 wherein the first host sets a host-adding bit in the first superframe when the second host transfers a second superframe to the first host in accordance with the wireless universal serial bus protocol to enable communication between the second host and the device.

6. The wireless universal serial bus system as set forth in claim 5, wherein the device receives the host-adding bit from the first host and the first host resets the host- adding bit in response to a reply signal transferred from the device.

7. The wireless universal serial bus system as set forth in claim 5, wherein each of the first and second superframes includes a beacon and a distributed reservation protocol region for communication with the device.

8. The wireless universal serial bus system as set forth in claim 5, wherein the distributed reservation protocol region includes a micro-scheduled management command packet and a data field.

9. The wireless universal serial bus system as set forth in claim 8, wherein the micro-scheduled management command packet of the first superframe includes a media access control header having the host-adding bit.

10. The wireless universal serial bus system as set forth in claim 5, wherein the wireless universal serial bus protocol supports a WiMedia protocol.

11. The wireless universal serial bus system as set forth in claim 5, wherein the device is one of a wireless printer, a wireless scanner, a wireless mouse, or a wireless keyboard.

12. A method for driving a wireless universal serial bus system, comprising:
communicating between a first host and a device through a first superframe according to a wireless universal serial bus protocol; and
setting a host-adding bit of the first superframe when a second host transfers a second superframe to the first host according to the wireless universal serial bus protocol to enable communication between the second host and the device.

13. The method as set forth in claim 12, wherein the device receives the host- adding bit from the first host and the first host resets the host-adding bit in response to a reply signal transferred from the device.

14. The method as set forth in claim 12, wherein each of the first and second superframes includes a beacon and a distributed reservation protocol region for communication with the device.

15. The method as set forth in claim 14, wherein the distributed reservation protocol region includes a micro-scheduled management command packet and a data field.

16. The method as set forth in claim 15, wherein the micro-scheduled management command packet of the first superframe includes a media access control header having the host-adding bit.

17. The method as set forth in claim 12, wherein the wireless universal serial bus protocol supports a WiMedia protocol.

18. The method as set forth in claim 12, wherein the device is one of a wireless printer, a wireless scanner, a wireless mouse, or a wireless keyboard.

* * * * *